US009424277B2

(12) United States Patent
Retterath et al.

(10) Patent No.: US 9,424,277 B2
(45) Date of Patent: Aug. 23, 2016

(54) METHODS AND APPARATUS FOR AUTOMATED TRUE OBJECT-BASED IMAGE ANALYSIS AND RETRIEVAL

(71) Applicant: Google Inc., Mountain View, CA (US)

(72) Inventors: Jamie E. Retterath, Eden Prairie, MN (US); Robert A. Laumeyer, Minneapolis, MN (US)

(73) Assignee: Google Inc., Mountain View, CA (US)

( * ) Notice: Subject to any disclaimer, the term of this patent is extended or adjusted under 35 U.S.C. 154(b) by 120 days.

(21) Appl. No.: 14/529,710

(22) Filed: Oct. 31, 2014

(65) Prior Publication Data

US 2015/0104104 A1 Apr. 16, 2015

Related U.S. Application Data

(63) Continuation of application No. 13/366,870, filed on Feb. 6, 2012, now Pat. No. 8,903,199, which is a continuation of application No. 12/584,894, filed on Sep. 14, 2009, now Pat. No. 8,150,216, which is a
(Continued)

(51) Int. Cl.
*G06K 9/00* (2006.01)
*G06F 17/30* (2006.01)
(Continued)

(52) U.S. Cl.
CPC ..... *G06F 17/30256* (2013.01); *G06F 17/3025* (2013.01); *G06F 17/30259* (2013.01);
(Continued)

(58) Field of Classification Search
None
See application file for complete search history.

(56) References Cited

U.S. PATENT DOCUMENTS

| 64,769 A | 5/1867 | Hull |
| 3,636,250 A | 1/1972 | Haeff |

(Continued)

FOREIGN PATENT DOCUMENTS

| WO | 9709823 A1 | 3/1997 |
| WO | 9824242 A1 | 6/1998 |

(Continued)

OTHER PUBLICATIONS

J Patrick Bixler, Department of Computer Science, Virginia Tech, Blacksburg, Virginia; David P. Miller Artificial Intelligence Group, Jet Propulsion Laboratory, California Institute of Technology, Pasadena, California, "Extracting text fromreal-world scenes", Article, 8 pp., 1988.

(Continued)

*Primary Examiner* — Aaron W Carter
(74) *Attorney, Agent, or Firm* — Lerner, David, Littenberg, Krumholz & Mentlik, LLP

(57) ABSTRACT

An automated and extensible system for analysis and retrieval of images based on region-of-interest (ROI) analysis of one or more true objects depicted by an image is provided. The system uses a database that is a relational or analytical database containing searchable vectors that represent the images stored in a repository. Entries in the database are created by an image locator and ROI classifier working together to locate images within the repository and extract relevant information to be stored in the ROI database. The ROI classifier analyzes objects in an image to arrive at actual features of the true object. Graphical searches are performed by the collaborative workings of an image retrieval module, an image search requestor and an ROI query module. The image search requestor is an abstraction layer that translates user or agent search requests into the language understood by the ROI query.

20 Claims, 10 Drawing Sheets

Related U.S. Application Data continuation of application No. 11/122,969, filed on May 5, 2005, now Pat. No. 7,590,310.

(60) Provisional application No. 60/568,412, filed on May 5, 2004.

(51) Int. Cl.
*G06K 9/32* (2006.01)
*G06K 9/46* (2006.01)

(52) U.S. Cl.
CPC ..... *G06F17/30262* (2013.01); *G06K 9/00536* (2013.01); *G06K 9/3233* (2013.01); *G06K 9/46* (2013.01); *G06K 9/4652* (2013.01); *G06K 2009/4666* (2013.01); *Y10S 707/99933* (2013.01)

(56) References Cited

U.S. PATENT DOCUMENTS

| | | | |
|---|---|---|---|
| 4,348,652 A | 9/1982 | Barnes et al. |
| 4,373,819 A | 2/1983 | Pallotta |
| 4,491,923 A | 1/1985 | Look |
| 4,721,389 A | 1/1988 | Dejaiffe |
| 4,726,134 A | 2/1988 | Woltman |
| 4,920,385 A | 4/1990 | Clarke et al. |
| 4,937,950 A | 7/1990 | Farnworth |
| 5,050,327 A | 9/1991 | Woltman |
| 5,115,398 A | 5/1992 | De Jong |
| 5,164,785 A | 11/1992 | Hopkins et al. |
| 5,353,392 A | 10/1994 | Luquet et al. |
| 5,373,357 A | 12/1994 | Hopkins et al. |
| 5,392,365 A | 2/1995 | Steinkirchner |
| 5,448,484 A | 9/1995 | Bullock et al. |
| 5,465,115 A | 11/1995 | Conrad et al. |
| 5,465,308 A | 11/1995 | Hutcheson et al. |
| 5,491,517 A | 2/1996 | Kreitman et al. |
| 5,530,549 A | 6/1996 | Brown |
| 5,533,388 A | 7/1996 | Yamamoto et al. |
| 5,579,471 A | 11/1996 | Barber et al. |
| 5,613,055 A | 3/1997 | Shimoura et al. |
| 5,627,549 A | 5/1997 | Park |
| 5,627,915 A | 5/1997 | Rosser et al. |
| 5,633,944 A | 5/1997 | Guibert et al. |
| 5,633,946 A | 5/1997 | Lachinski et al. |
| 5,647,058 A | 7/1997 | Agrawal et al. |
| 5,649,032 A | 7/1997 | Burt et al. |
| 5,664,948 A | 9/1997 | Dimitriadis et al. |
| 5,696,503 A | 12/1997 | Nasburg |
| 5,699,444 A | 12/1997 | Palm |
| 5,740,274 A | 4/1998 | Ono et al. |
| 5,751,286 A | 5/1998 | Barber et al. |
| 5,751,450 A | 5/1998 | Robinson |
| 5,757,878 A | 5/1998 | Dobbs et al. |
| 5,764,411 A | 6/1998 | Shanks |
| 5,790,691 A | 8/1998 | Narayanswamy et al. |
| 5,793,034 A | 8/1998 | Wesolowicz et al. |
| 5,802,361 A | 9/1998 | Wang et al. |
| 5,818,640 A | 10/1998 | Watanabe et al. |
| 5,844,699 A | 12/1998 | Usami et al. |
| 5,852,823 A | 12/1998 | De Bonet |
| 5,864,630 A | 1/1999 | Cosatto et al. |
| 5,892,847 A | 4/1999 | Johnson |
| 5,893,095 A | 4/1999 | Jain et al. |
| 5,899,999 A * | 5/1999 | De Bonet ........... G06F 17/3025 |
| 5,911,139 A | 6/1999 | Jain et al. |
| 5,915,032 A | 6/1999 | Look |
| 5,930,783 A | 7/1999 | Li et al. |
| 5,938,319 A | 8/1999 | Hege |
| 5,941,944 A | 8/1999 | Messerly |
| 5,949,914 A | 9/1999 | Yuen |
| 5,950,190 A | 9/1999 | Yeager et al. |
| 5,974,521 A | 10/1999 | Akerib |
| 5,982,298 A | 11/1999 | Lappenbusch et al. |
| 5,983,237 A | 11/1999 | Jain et al. |
| 5,991,085 A | 11/1999 | Rallison et al. |
| 6,011,515 A | 1/2000 | Radcliffe et al. |
| 6,018,697 A | 1/2000 | Morimoto et al. |
| 6,023,967 A | 2/2000 | Chung et al. |
| 6,036,322 A | 3/2000 | Nilsen et al. |
| 6,048,069 A | 4/2000 | Nagaoka et al. |
| 6,064,768 A | 5/2000 | Hajj et al. |
| 6,084,595 A | 7/2000 | Bach et al. |
| 6,104,835 A | 8/2000 | Han |
| 6,108,612 A | 8/2000 | Vescovi et al. |
| 6,123,263 A | 9/2000 | Feng |
| 6,124,864 A | 9/2000 | Madden et al. |
| 6,134,819 A | 10/2000 | McClain et al. |
| 6,141,433 A | 10/2000 | Moed et al. |
| 6,141,434 A | 10/2000 | Christian et al. |
| 6,142,871 A | 11/2000 | Inoue |
| 6,166,813 A | 12/2000 | Roberts |
| 6,173,231 B1 | 1/2001 | Chojnacki |
| 6,173,275 B1 | 1/2001 | Caid et al. |
| 6,182,011 B1 | 1/2001 | Ward |
| 6,199,014 B1 | 3/2001 | Walker et al. |
| 6,208,386 B1 | 3/2001 | Wilf et al. |
| 6,212,480 B1 | 4/2001 | Dunne |
| 6,226,636 B1 | 5/2001 | Abdel-Mottaleb et al. |
| 6,240,424 B1 | 5/2001 | Hirata |
| 6,240,664 B1 | 6/2001 | Hjaltason |
| 6,252,632 B1 | 6/2001 | Cavallaro |
| 6,253,477 B1 | 7/2001 | Balint |
| 6,266,442 B1 | 7/2001 | Laumeyer et al. |
| 6,269,358 B1 | 7/2001 | Hirata |
| 6,271,840 B1 | 8/2001 | Finseth et al. |
| 6,292,227 B1 | 9/2001 | Wilf et al. |
| 6,317,058 B1 | 11/2001 | Lemelson et al. |
| 6,321,158 B1 | 11/2001 | DeLorme et al. |
| 6,351,710 B1 | 2/2002 | Mays |
| 6,363,161 B2 | 3/2002 | Laumeyer et al. |
| 6,381,362 B1 | 4/2002 | Deshpande et al. |
| 6,382,126 B1 | 5/2002 | Findley |
| 6,383,871 B1 | 5/2002 | Noble et al. |
| 6,384,471 B1 | 5/2002 | Petit et al. |
| 6,384,871 B1 | 5/2002 | Wilf et al. |
| 6,389,417 B1 | 5/2002 | Shin et al. |
| 6,389,424 B1 | 5/2002 | Kim et al. |
| 6,405,132 B1 | 6/2002 | Breed et al. |
| 6,407,674 B1 | 6/2002 | Gallagher |
| 6,411,953 B1 | 6/2002 | Ganapathy et al. |
| 6,424,914 B1 | 7/2002 | Lin |
| 6,430,499 B1 | 8/2002 | Nakano et al. |
| 6,434,257 B1 | 8/2002 | Mohan et al. |
| 6,438,130 B1 | 8/2002 | Kagan et al. |
| 6,438,561 B1 | 8/2002 | Israni et al. |
| 6,445,834 B1 | 9/2002 | Rising, III |
| 6,446,060 B1 | 9/2002 | Bergman et al. |
| 6,449,384 B2 | 9/2002 | Laumeyer et al. |
| 6,453,056 B2 | 9/2002 | Laumeyer et al. |
| 6,463,432 B1 | 10/2002 | Murakawa |
| 6,470,267 B1 | 10/2002 | Nozaki |
| 6,476,910 B1 | 11/2002 | Hermes |
| 6,477,460 B2 | 11/2002 | Kepler |
| 6,493,705 B1 | 12/2002 | Kobayashi et al. |
| 6,498,982 B2 | 12/2002 | Bellesfield et al. |
| 6,501,862 B1 | 12/2002 | Fukuhara et al. |
| 6,502,105 B1 | 12/2002 | Yan et al. |
| 6,507,441 B1 | 1/2003 | Eisenberg et al. |
| 6,512,857 B1 | 1/2003 | Hsu et al. |
| 6,514,082 B2 | 2/2003 | Kaufman et al. |
| 6,514,597 B1 | 2/2003 | Strobel et al. |
| 6,525,768 B2 | 2/2003 | Obradovich |
| 6,525,780 B1 | 2/2003 | Bruno et al. |
| 6,526,352 B1 | 2/2003 | Breed et al. |
| 6,526,400 B1 | 2/2003 | Takata et al. |
| 6,538,751 B2 | 3/2003 | Ono |
| 6,542,822 B1 | 4/2003 | Froeberg |
| 6,549,660 B1 | 4/2003 | Lipson et al. |
| 6,558,021 B2 | 5/2003 | Wu et al. |
| 6,563,959 B1 | 5/2003 | Troyanker |
| 6,566,710 B1 | 5/2003 | Strachan et al. |
| 6,567,103 B1 | 5/2003 | Chaudhry |

(56) References Cited

U.S. PATENT DOCUMENTS

| | | | |
|---|---|---|---|
| 6,567,551 B2 | 5/2003 | Shiiyama |
| 6,574,378 B1 | 6/2003 | Lim |
| 6,574,616 B1 | 6/2003 | Saghir |
| 6,575,378 B2 | 6/2003 | Aoki et al. |
| 6,584,221 B1 | 6/2003 | Moghaddam et al. |
| 6,594,931 B1 | 7/2003 | Barton et al. |
| 6,604,398 B1 | 8/2003 | Hansen |
| 6,611,628 B1 | 8/2003 | Sekiguchi et al. |
| 6,625,315 B2 | 9/2003 | Laumeyer et al. |
| 6,631,364 B1 | 10/2003 | Rioux et al. |
| 6,647,141 B1 | 11/2003 | Li |
| 6,653,990 B1 | 11/2003 | Lestruhaut |
| 6,671,615 B1 | 12/2003 | Becker et al. |
| 6,674,878 B2 | 1/2004 | Retterath et al. |
| 6,678,591 B2 | 1/2004 | Ohmura et al. |
| 6,714,860 B1 | 3/2004 | Wawra et al. |
| 6,772,062 B2 | 8/2004 | Lasky et al. |
| 6,774,908 B2 | 8/2004 | Bates et al. |
| 6,778,224 B2 | 8/2004 | Dagtas et al. |
| 6,778,697 B1 | 8/2004 | Shin et al. |
| 6,782,125 B2 | 8/2004 | Lee et al. |
| 6,791,492 B2 | 9/2004 | Miyasaka et al. |
| 6,801,661 B1 | 10/2004 | Sotak et al. |
| 6,820,277 B1 | 11/2004 | Eldering et al. |
| 6,836,724 B2 | 12/2004 | Becker et al. |
| 6,856,987 B2 | 2/2005 | Kobayashi et al. |
| 6,873,743 B2 | 3/2005 | Steinberg |
| 6,885,767 B1 | 4/2005 | Howell |
| 6,888,622 B2 | 5/2005 | Shimomura |
| 6,891,960 B2 | 5/2005 | Retterath et al. |
| 7,031,983 B2 | 4/2006 | Israni et al. |
| 7,039,630 B2 | 5/2006 | Shimazu |
| 7,043,057 B2 | 5/2006 | Retterath et al. |
| 7,054,861 B2 | 5/2006 | Kobayashi et al. |
| 7,062,083 B2 | 6/2006 | Lim et al. |
| 7,065,248 B2 | 6/2006 | Lee et al. |
| 7,082,426 B2 | 7/2006 | Musgrove et al. |
| 7,092,548 B2 | 8/2006 | Laumeyer et al. |
| 7,130,466 B2 | 10/2006 | Seeber |
| 7,173,707 B2 | 2/2007 | Retterath et al. |
| 7,254,285 B1 | 8/2007 | Paek et al. |
| 7,272,498 B2 | 9/2007 | Singh |
| 7,409,110 B2 | 8/2008 | Kayahara |
| 7,411,681 B2 | 8/2008 | Retterath et al. |
| 7,440,003 B2 | 10/2008 | Shimamura et al. |
| 7,444,003 B2 | 10/2008 | Laumeyer et al. |
| 7,499,590 B2 | 3/2009 | Seeber |
| 7,515,736 B2 | 4/2009 | Retterath et al. |
| 7,578,441 B2 | 8/2009 | Gower et al. |
| 7,590,310 B2 | 9/2009 | Retterath et al. |
| 7,664,803 B2 | 2/2010 | Kobayashi et al. |
| 7,774,782 B1* | 8/2010 | Popescu ............ G06F 9/505 709/202 |
| 8,107,739 B2 | 1/2012 | Seeber |
| 8,150,216 B2 | 4/2012 | Retterath et al. |
| 8,503,797 B2 | 8/2013 | Turkelson et al. |
| 8,705,897 B1 | 4/2014 | Chao et al. |
| 8,755,837 B2 | 6/2014 | Rhoads et al. |
| 8,762,383 B2 | 6/2014 | Valencia-Campo et al. |
| 2001/0021011 A1 | 9/2001 | Ono |
| 2001/0028739 A1 | 10/2001 | Lee et al. |
| 2001/0036293 A1 | 11/2001 | Laumeyer et al. |
| 2001/0043717 A1 | 11/2001 | Laumeyer et al. |
| 2001/0043718 A1 | 11/2001 | Laumeyer et al. |
| 2001/0045034 A1 | 11/2001 | Mueller et al. |
| 2002/0044278 A1 | 4/2002 | Le |
| 2002/0051572 A1 | 5/2002 | Matsumoto et al. |
| 2002/0057343 A1 | 5/2002 | Ronk et al. |
| 2002/0063638 A1 | 5/2002 | Gallagher |
| 2002/0090492 A1 | 7/2002 | Haunschild et al. |
| 2002/0097914 A1 | 7/2002 | Yaung |
| 2002/0106109 A1 | 8/2002 | Retterath et al. |
| 2002/0114522 A1 | 8/2002 | Seeber |
| 2002/0122587 A1 | 9/2002 | Lim et al. |
| 2002/0163942 A1 | 11/2002 | Baillargeon et al. |
| 2002/0176623 A1 | 11/2002 | Steinberg |
| 2002/0186865 A1 | 12/2002 | Retterath et al. |
| 2003/0004644 A1 | 1/2003 | Farmer |
| 2003/0006911 A1 | 1/2003 | Smith et al. |
| 2003/0016869 A1 | 1/2003 | Laumeyer et al. |
| 2003/0044062 A1 | 3/2003 | Ganapathy et al. |
| 2003/0090415 A1 | 5/2003 | Miyasaka et al. |
| 2003/0126125 A1 | 7/2003 | Kim et al. |
| 2003/0174054 A1 | 9/2003 | Shimomura |
| 2003/0194126 A1 | 10/2003 | Shin et al. |
| 2003/0195883 A1* | 10/2003 | Mojsilovic ........ G06F 17/30256 |
| 2003/0198380 A1 | 10/2003 | Shin et al. |
| 2004/0002964 A1 | 1/2004 | Kobayashi et al. |
| 2004/0062442 A1 | 4/2004 | Laumeyer et al. |
| 2004/0071363 A1 | 4/2004 | Kouri et al. |
| 2004/0078813 A1 | 4/2004 | Kobuya et al. |
| 2004/0109608 A1 | 6/2004 | Love et al. |
| 2004/0127614 A1 | 7/2004 | Jiang et al. |
| 2004/0133927 A1* | 7/2004 | Sternberg .......... G06F 17/30247 725/136 |
| 2004/0156531 A1 | 8/2004 | Retterath et al. |
| 2004/0184077 A1 | 9/2004 | Umeda |
| 2004/0184670 A1 | 9/2004 | Jarman et al. |
| 2004/0208359 A1 | 10/2004 | Pishva |
| 2004/0218910 A1 | 11/2004 | Chang et al. |
| 2004/0228542 A1 | 11/2004 | Zhang et al. |
| 2005/0011959 A1 | 1/2005 | Grosvenor |
| 2005/0021472 A1 | 1/2005 | Gettman et al. |
| 2005/0050038 A1 | 3/2005 | Kobayashi et al. |
| 2005/0232494 A1 | 10/2005 | Fan |
| 2005/0249378 A1 | 11/2005 | Retterath et al. |
| 2005/0271304 A1 | 12/2005 | Retterath et al. |
| 2006/0074923 A1 | 4/2006 | Gower et al. |
| 2006/0112088 A1 | 5/2006 | Kobayashi et al. |
| 2006/0143176 A1 | 6/2006 | Mojsilovic et al. |
| 2006/0195858 A1 | 8/2006 | Takahashi et al. |
| 2006/0262312 A1 | 11/2006 | Retterath et al. |
| 2007/0043707 A1 | 2/2007 | Kulkarni et al. |
| 2007/0081744 A1 | 4/2007 | Gokturk et al. |
| 2007/0127823 A1 | 6/2007 | Seeber |
| 2007/0133947 A1* | 6/2007 | Armitage .......... G06F 17/30256 386/224 |
| 2007/0154067 A1 | 7/2007 | Laumeyer et al. |
| 2007/0216904 A1 | 9/2007 | Retterath et al. |
| 2007/0245400 A1 | 10/2007 | Paek et al. |
| 2008/0131004 A1 | 6/2008 | Farmer et al. |
| 2009/0110298 A1 | 4/2009 | Seeber |
| 2009/0252376 A1 | 10/2009 | Retterath et al. |
| 2010/0082597 A1 | 4/2010 | Retterath et al. |
| 2010/0135582 A1 | 6/2010 | Gokturk et al. |
| 2011/0013843 A1 | 1/2011 | Seeber |
| 2012/0134583 A1* | 5/2012 | Retterath ............. G06K 9/3233 382/165 |
| 2012/0140990 A1 | 6/2012 | Retterath et al. |
| 2012/0148118 A1 | 6/2012 | Lee et al. |
| 2013/0127893 A1 | 5/2013 | Gokturk et al. |
| 2013/0282712 A1 | 10/2013 | Brandt |
| 2014/0169686 A1 | 6/2014 | Conwell et al. |
| 2014/0193087 A1 | 7/2014 | Conwell |
| 2015/0131080 A1* | 5/2015 | Retterath ............... G01S 17/10 356/5.01 |

FOREIGN PATENT DOCUMENTS

| | | |
|---|---|---|
| WO | 9939160 A1 | 8/1999 |
| WO | 9954848 A1 | 10/1999 |

OTHER PUBLICATIONS

Application and File History for U.S. Appl. No. 09/928,218, filed Aug. 10, 2001, now U.S. Pat. No. 6,891,960, Inventors Retterath et al.

Application and File History for U.S. Appl. No. 11/056,926, filed Feb. 11, 2005, now U.S. Pat. No. 7,515,736, Inventors Retterath et al.

Application and File History for U.S. Appl. No. 12/419,843, filed Apr. 7, 2009, Inventors Retterath et al.

(56) References Cited

OTHER PUBLICATIONS

Application and File History for U.S. Appl. No. 09/918,375, filed Jul. 30, 2001, now U.S. Pat. No. 6,674,878, Inventors Retterath et al.
Application and File History for U.S. Appl. No. 10/736,454, filed Dec. 15, 2003, now U.S. Pat. No. 7,043,057, Inventors Retterath et al.
Application and File History for U.S. Appl. No. 11/381,503, filed May 3, 2006, now U.S. Pat. No. 7,173,707, Inventors Retterath et al.
Application and File History for U.S. Appl. No. 11/702,421, filed Feb. 5, 2007, now U.S. Pat. No. 7,411,681, Inventors Retterath et al.
Evgenious et al., "A Trainable Pedestrian Detection System," Center for Biological and Computational Learning and Artificial Intelligence Laboratory, MIT IEEE International Conference on Intelligent Vehicles, pp. 241-246, 1998.
Risack et al., "Robust Lane Recognition Embedded in a Real-Time Driver Assistance System," Fraunhofer-Institut Fur Informations, Karlsruhe, Germany IEEE International Conference on Intelligent Cehicles, pp. 35-40, 1998.
Kalinke et al., "A Texture-based Object detection and an Adaptive Model-Based Classification," Institute Fur Neuroinformatik, Bochum, Germany, IEEE International Conference on Intelligent Vehicles, pp. 143-148, 1998.
Internet Printout: The Road Sign Recognition System-RS2, Faculty of Transportation Sciences, Prague, Czech Republic, 7 pgs., c. approximately 1999.
Internet Printout: The Chamfer System, 4 pgs., c. approximately 1999.
You et al., "Real-Time Object Recognition: Hierarchical Image Matching in a Parallel Virtual Machine Environment," School of Computing and Information Technology, Griffith University, Brisbane, Australia, Dept. of Computer Engineering, University ofNebraska, Lincoln, Nebraska, 3 pgs., Aug. 1998.
Schutz et al., "Multi-Feature Matching Algorithm for Free-Form 3D Surface Registration," Institute for Microtechnology, Neuchatel, Switzerland, 3 pgs., Aug. 1998.
Baker et al., "Representation of Uncertainty in Spatial Target Tracking," DERA Farnborough, United Kingdom, 4 pgs., Aug. 1998.
Hjaltason et al., "Using Spatial Sorting and Ranking in Model Based Object Recognition," Computer Science Dept. University of Maryland, College Park, Maryland, 3 pgs., Aug. 1998.
Nwagboso et al., "Surveillance Systems for Terrestrial Transport Safety and Improved User Information Capability," Bolton Institute, Bolton, United Kingdom, Dept. of Biophysical & Electric Engineering, Genova, Italy, Vigitec, Brussels, Belgium, pp. 1-7, prior to May 2004.
Luo et al., "Landmark Recognition Using Projection Learning for Mobile Robot Navigation," Center for Robotics and Intelligent Machines, IEEE World Congress on Computational Intelligence, vol. IV, pp. 2703-2708, Jun. 1994.
Ghica et al., "Recognition of Traffic Signs by Artificial Neural Network," Dept. of Computer Science Memorial University of Newfoundland, IEEE, pp. 1444-1449, Mar. 1995.
Logemann, "Realtime Traffic Sign Recognition (TSR)," Ed., Univeritat Koblenz-Landau, 3 pgs., Nov. 1997.
Moss et al., "Registering Multiple Cartographic Models with the Hierarchical Mixture of Experts Algorithm," Dept. of Computer Science, University of New York, IEEE, pp. 909-914, 1997.
Crowley et al., "Multi-Modal Tracking of Faces for Video Communications," GRAVIR-IMAG, I.N.P. Grenoble, Grenoble, France, IEEE, pp. 640-645, 1997.
Escalera et al., "Road Traffic Sign Detection and Classification," IEEE Transactions on Industrial Electronics, vol. 44, No. 6, pp. 848-859, Dec. 1997.
Mandal, "Illumination Invariant Image Indexing Using Moments and Wavelets," Journal of Electronic Imaging, Apr. 1998, pp. 282-293, vol. 7, (2), USA.
Celentano, "Feature Integration and Relevance Feedback Analysis in Image Similarity Evaluation," Journal of Electronic Imaging, Apr. 1998, pp. 308-317, vol. 7(2), USA.
Carson et al., "Region Base Image Querying," Proc. of IEEE CUPR Workshop on Content-Based Access oflmages and Video Libraries, 1997, USA.
Lui et al., Scalable Object-Based Image Retrieval, a pdf paper, Sep. 2003.
Ozer et al., "A Graph Based Object Description for Information Retrieval in Digital Image and Video Libraries," a pdf paper, 1999, USA.
Fan et al., "Automatic Model-Based Semantic Object Extraction Algorithm," IEEE Trans on Circuits and Systems for Video Technology, vol. 11, No. 10, Oct. 2001, pp. 1073, USA.
Ardizzoni et al., "Windsurf: Region Based Image Retrieval Using Wavelets," Proc. of the 1.sup.st Int'l Workshop on Similarity Search, Sep. 1999, pp. 167-173, USA.
Application and File History for U.S. Appl. No. 11/122,969, filed May 5, 2005. Inventors: Jamie E. Retterath et al.
Hak et al., "Dominant Color Transform and Circular Pattern Vector for Traffic Sign Detection and Recognition," IEICE Transaction Fundamentals,vol. E81-A, No. 6, pp. 1128-1135, Jun. 1998.
Yanai et al., "An Architecture of Object Recognition System for Various Images Based on Multi-Agent," Dept. of Computer Science, University of Electro-Communications, Tokyo, Japan, and Dept. of Mathematical Engineering and Information Physics,University of Tokyo, Tokyo, Japan, 4 pgs., Feb. 1998.
Estable et al., "A Real-Time Traffic Sign Recognition Systems," Daimler-Benz Research Center, Proceedings of the Intelligent Vehicles '94 Symposium, Paris, France, pp. 213-218, Oct. 1994.
Estevez, "Auto-Associative Segmentation for Real-Time Object Recognition in Realistic Outdoor Images," Journal of Electronic Imaging, Apr. 1998, pp. 378-385, vol. 7(2), Apr. 1998, USA.
Liu et al., "Using Centroid Covariance in Target Recognition", Dept. of Electrical Engineering, University of Washington, Seattle, Washington, 4 pgs, Aug. 1998.

* cited by examiner

METHODS AND APPARATUS FOR AUTOMATED TRUE OBJECT-BASED IMAGE ANALYSIS AND RETRIEVAL

CROSS-REFERENCE TO RELATED APPLICATIONS

The present application is a continuation of U.S. patent application Ser. No. 13/366,870, filed Feb. 6, 2012, which is a continuation of U.S. patent application Ser. No. 12/584, 894, filed Sep. 14, 2009, which is a continuation of U.S. patent application Ser. No. 11/122,969, filed May 5, 2005, now U.S. Pat. No. 7,590,310, which claims the benefit of the filing date of U.S. Provisional Patent Application No. 60/568,412, filed May 5, 2004, the entire disclosures of which are hereby incorporated herein by reference.

FIELD OF THE INVENTION

This invention generally relates to query processing or search techniques for databases or files containing visual information or images. More specifically, the present invention is directed to an automated and extensible system for the analysis and retrieval of images based on region-of-interest (ROI) analysis of one or more true objects depicted by an image.

BACKGROUND OF THE INVENTION

The proliferation of digital images and video has been a direct result of more efficient methods for gathering digital imagery. From recording devices such as digital cameras and digital video recorders, to digitizers for CCTV and broadcast media, to 2-D home and office scanners for producing digitized versions of photographs, the myriad digital recording methods has created an explosion of digital media.

For purposes of the present invention, the term "image" will signify a two-dimensional digital representation of a scene, typically created and digitized by an image capture device, signifying a standalone event or a momentary representation of a sequence of events. The term "object" will refer to a uniquely identifiable physical thing or item at least partially depicted in an image. The term "content" will refer to the subject matter of an image.

Along with the countless forms of digital imagery, many different methods have appeared that attempt to organize and structure the digital repositories in such a way that permit retrieval of images in a structured or semi-structured fashion. Unfortunately, providing some structure to the imagery requires conformance to a certain format, necessitates an input process that structures the information, or requires human interaction to annotate the imagery for later retrieval. The most popular examples of image search engines, such as Alta Vista and Google, for example, rely exclusively on annotations and/or file names associated with the images as the only basis for determining whether that image contains desired visual information.

Some image search systems have attempted to overcome the "input requirements" of an annotated image repository by automating the extraction of image features for objects depicted within the data set of the image that results in significantly-reduced representations of the contents of the image repository, thereby decreasing the search time for desired images. U.S. Pat. No. 6,438,130, for example, describes a multi-level filtering technique for reducing the data for content-based image searches. U.S. Pat. No. 6,271, 840 discusses a browser interface for displaying reduced versions of images created by an integrated page renderer.

Several techniques exist for the indexing, categorization, and description of images that will be retrieved via a multitude of searching algorithms. Typical image indexing techniques utilize basic attributes like color, shape and texture to describe images or regions of interest within those images.

U.S. Pat. No. 6,778,697 discloses a color image processing method for retrieving a color feature descriptor for describing color features of an image. The color image processing method includes obtaining color vectors of an input image, classifying the color vectors to obtain dominant colors of the input image and their ratios, and representing the dominant colors and their ratios as a color feature descriptor of the input image to allow fast search and retrieval. U.S. Pat. No. 6,411,953 provides a perceptually-based system for pattern retrieval and matching which uses a predetermined vocabulary comprising one or more dimensions to extract color and texture information from an image selected by a user. The system then generates a distance measure characterizing the relationship of the selected image to another image stored in a database, by applying a grammar, comprising a set of predetermined rules, to the color and texture information extracted from the selected image and corresponding color and texture information associated with the stored image.

U.S. Pat. No. 5,802,361 discloses an analysis and retrieval system that uses image attributes to retrieve selected images from a database. The patent provides a fundamental description of the process required to search large image archives for desired images.

U.S. Pat. Nos. 5,893,095 and 5,911,139 describe a system for content-based search and retrieval that utilizes primitives to operate on visual objects. The fundamental approach taught in this patent is the comparison of visual objects and the ability to identify similarities in visual perception of the images. Another approach that utilizes similarity of images is described in U.S. Pat. Nos. 6,463,432 and 6,226,636 ('636). The '636 patent discloses a system that builds a database which stores data corresponding to a plurality of images by dividing each image into several regions. Then, the system calculates a histogram of each region. The database may then be used to determine images which are similar to a query image. U.S. Pat. No. 6,502,105 teaches a system that builds a database of image-related data by inputting a plurality of images, and for each image: dividing the image into a plurality of regions and generating a graph based on the regions, and storing data for the graph in the database. The database may then be used to determine whether a query image is similar to one or more of the plurality of images by dividing the query image into regions and generating a graph based on the regions, and comparing the generated graph to other graphs in the database that correspond to the plurality of images. U.S. Pat. No. 6,240, 424 teaches a method and apparatus for classifying and querying a database of images, in which the images in the database are classified using primary objects as a clustering center.

U.S. Pat. No. 5,983,237 discloses an image analysis system consisting of a visual dictionary, a visual query processing method, an image database, a visual query processing system, and the creation of feature vectors. This system discusses the processing of imagery as an integral part of storing the image in the database, whereby both annotated text and feature vectors can be associated with the image. The subsequent searching of images can occur via text searches based on the annotation and on visual searches based on the feature vectors of that image.

U.S. Pat. No. 6,084,595 discloses a method of utilizing indexed retrieval to improve computational efficiency for searching large databases of objects such as images. The premise of the approach is to negate the requirement of a query engine to search all vectors for an image within a feature vector database.

U.S. Pat. No. 6,389,417 discloses a more advanced approach to image retrieval based on determining characteristics of images within regions, not for an entire image. The system is limited, however, to using query regions based on an image supplied by the user, thus limiting the invention to finding images that contain regions similar to a target region within a provided image.

U.S. Pat. No. 6,566,710 reveals a graphical search technique based on joint histograms. The invention discloses usable methods for achieving matches and/or near-matches of images based on similar joint histograms.

U.S. Pat. No. 6,574,378 describes a search and retrieval system based on "visual keywords derived using a learning technique from a plurality of visual tokens extracted across a predetermined number of visual elements." As with the other systems and methods described above, this patent utilizes the analysis of the image and its contents, with no mention of understanding the various elements or objects that comprise the components within the scene.

U.S. Pat. No. 6,574,616 attempts to improve on image understanding of the preferences of a given user by using probability functions. The system suffers from the requirement that images must be iteratively selected by a user, with more images presented based on the iterative selections and the probability functions of the images.

U.S. Pat. No. 6,584,221 describes advances in image search and retrieval by separating images into regions of interest and making searches based on color and texture. While image color and texture of a region of interest are used in this patent, no attempt is made to determine the physical attributes of the objects depicted in the images.

U.S. Pat. No. 6,611,628 reveals an image feature-coding scheme that assigns a color and a relative area to regions within an image frame. This approach utilizes image and frame color for the feature coding, with no attempts made to interpret the actual color of the objects depicted in the images.

U.S. Pat. Nos. 5,579,471, 5,647,058, and 6,389,424 describe various techniques for creating high dimensional index structures that are used for content-based image retrieval. U.S. Pat. No. 5,647,058 discloses a high dimensional indexing method which takes a set of objects that can be viewed as N-dimensional data vectors and builds an indexed set of truncated transformed vectors which treats the objects like k-dimensional points. The set of truncated transformed vectors can be used to conduct a preliminary similarity search using the previously created index to retrieve the qualifying records.

U.S. Pat. No. 6,563,959 describes a perceptual similarity image retrieval system in which images are subdivided into spots with similar characteristics and each image is represented by a group of spot descriptors.

Techniques have been described for creating a so-called blobworld or regional representation of an image as part of a region-based image querying. See, Carson et al., "Region Base Image Querying," *Proc. of IEEE CVPR Workshop on Content-Based Access of Images and Video Libraries,* 1997, Lui et al., "Scalable Object-Based Image Retrieval,".pdf paper, Ozer et al., "A Graph Based Object Description for Information Retrieval in Digital Image and Video Libraries, ".pdf paper, Fan et al., "Automatic Model-Based Semantic Object Extraction Algorithm," *IEEE Trans. on Circuits and Systems for Video Technology,* Vol. 11, No. 10, October 2001, pp. 1073, and Ardizzoni, et al., "Windsurf: Region-based image retrieval using wavelets," *Proc. of the 1st Int'l Workshop on Similarity Search,* September 1999, pp. 167-173. These references describe different techniques for the creation, segmentation or hierarchical arrangement of representations of an image using a region-based, blobworld representation of that image.

Large image repositories will undoubtedly contain imagery from a multitude of input sources. Any image search and retrieval mechanism must be specifically designed to deal with the wide variation of attribute types that will result from the myriad input sources. For a repository as complex and diverse as the Internet, a flexible image search and retrieval engine should be able to interpret information from the original image independent of the type of input device or digitizer that was used to create the image.

Computer vision and image processing techniques alone are not adequate for robust image search and retrieval. In addition, implementing image retrieval on a large scale requires automated techniques for analyzing, tagging and managing the visual assets. What is needed for large-scale image search and retrieval that is an automated system that can operate on unstructured data. This automated system must utilize techniques beyond traditional image processing in order to increase the hit rate of image retrieval that demanding users will require. Furthermore, the system must be capable of dealing with a constantly changing target image set wherein the system has little or no control over the content placed within the image search space.

BRIEF SUMMARY OF THE INVENTION

The present invention is an automated and extensible system for the analysis and retrieval of images based on region-of-interest (ROI) analysis of one or more true objects depicted by an image. The system uses a Regions Of Interest (ROI) database that is a relational or analytical database containing searchable vectors that represent the images stored in a repository. Entries in the ROI database are created by an image locator and ROI classifier that work in tandem to locate images within the repository and extract the relevant information that will be stored in the ROI database. Unlike existing region-of-interest search systems, the ROI classifier analyzes objects in an image to arrive at the actual features of the true object, instead of merely describing the features of the image of that object. Graphical searches are performed by the collaborative workings of an image retrieval module, an image search requestor and an ROI query module. The image search requestor is an abstraction layer that translates user or agent search requests into the language understood by the ROI query.

The ROI analysis of the present invention focuses on the actual features of an object, which are referred to for purposes of this invention as the "true object" or "physical object," instead of the features as represented by the content of an image. For example, if an image of an object, such as a car, is shot at sunset, a person understands that the color features of that image will be distorted from the actual color of the true object. A red car may appear as a purple car or an orange car in the image, but the true physical object is still a red car. The ROI analysis preferably utilizes a combination of techniques to arrive at the features of the true object. In the case of color, for example, a fuzzy logic color filter technique is utilized to deduce the true color as a true or "physical" vector of a given object represented by a region of interest. For purposes of the present invention, the actual qualities or characteristics of an object derived by the ROI analysis will be referred to as the "physical feature vectors" associated with that true physical object.

Regions of interest representing an object in an image can be described in a multitude of types and formats. Examples of region of interest descriptions include, but are not limited to bounding boxes, polygons, and masks. Entries in the ROI database have an ROI type field that contains the type of the region of interest, and an ROI descriptor field that contains the description of the region of interest that is of the format indicated by the type. Since the number of bytes needed to describe a region of interest is quite diverse, the ROI descriptor field can be a small as a few bytes and can be as large as several kilobytes. Other fields in the ROI data structure for each entry in the ROI database are the physical color vector, physical shape vector and physical texture vector. Other physical vectors are also allowed within the data structure, including physical size vector, physical location vector and physical content vector.

Images will typically contain multiple regions of interest. The invention described herein allows search and retrieval at the region of interest level, not at the image level. This allows specific searches to be performed for desired objects without regard to other items that may appear in the imagery. This approach does not preclude searches for images that contain multiple objects. It merely confines the search criteria to the physical object level, leaving multi-object searches to a hierarchical layer above the object search layer.

The image locator preferably contains automated routines that continually search the repository for the existence of new imagery. Software utilized for searching can be web crawlers, spiders, or any other type of intelligent agent that can continuously search an unstructured network for the existence of new or updated files.

Any graphical search request will be initiated either by an intelligent agent or by a user. The user search request can originate from inside or outside the network on which the search will take place.

The systems described in the prior art disclosures have gone to great lengths to categorize, classify, locate and retrieve imagery based on image characteristics. Image attributes like texture, shape and color have proven to be fairly reliable in retrieving images based on selections of combinations of these attributes. The main drawback, however, has been the focus on utilizing image characteristics for search criteria.

As an example, assume an image exists for a red car. As long as the angle of the camera with respect to the car allows the image to show a strong shape component for a car, a shape search for car will yield reasonable results. Furthermore, if the image were taken on a sunny day the color in the image will contain a strong red component. If, however, the image were taken with the car sitting under a tree, the shape characteristic would be impacted by the outline of the tree, and the bright red finish of the car would be duller, and perhaps not even red. If the image's color space were RGB, the red component could possibly be the weakest of the three components.

In this example, a traditional search for "red car" would probably not yield a hit on this object because the shape of the object was compromised and because the color of the object was not well represented in the image. In contrast, the present invention represents searchable regions of interest not by their image attributes, but by their true physical object attributes.

Oftentimes the process of capturing imagery will add noise (which can impact the object's texture and/or shape) or will dramatically change the representative color of the imaged object. Imprecise or ill-controlled image capture techniques should not spoil the quality of the search and retrieval system. The present invention overcomes these problems by providing for an image search and retrieval system based on the actual characteristics of the physical object depicted by the image, not based on the characteristics contained within the image.

Determining physical vectors or attributes of true physical objects is a compute-intensive operation. These computations, however, are part of the image categorization phase, not the retrieval phase. The system described herein is designed to retrieve information very rapidly by utilizing simple searches for object attributes that have been created as part of the previously completed image categorization phase.

Large repositories like corporate intranets and the Internet have a multitude of sources for new and updated information. The system described herein utilizes a crawler, spider or other intelligent agent to constantly update the image categorization process of search information for all imagery. A limitation of the invention, at least with today's technology, is the image search space is confined to those images that have been processed by the image categorization classifier. A repository the size of the Internet might not be fully searchable until the classifier had been given sufficient time to locate and analyze most of the images in the available search space, which could require months of operation on a large farm of computers before a critical mass of image analysis had been performed to allow reasonably representative searches. It will be noted that the inputs to the classifier, however, can be directed to concentrate on certain pockets of information within the image domain to achieve the earliest functionality for the search and retrieval system.

Both the classification and the retrieval functionality of this invention are designed to operate on single computers, on multiple computers, or on a distributed network of computers. The system diagrams show a single Region Of Interest (ROI) database, but the system works just as well with multiple databases populated at several points throughout the network. If multiple ROI databases are utilized, there is no strict requirement that any synchronization exists between the different versions. It is possible, however, to have a completely separate or a fully integrated software program that searches the other ROI databases for new or updated ROI entries. These entries could then be replicated into the local ROI database.

DETAILED DESCRIPTION

Figure 1:
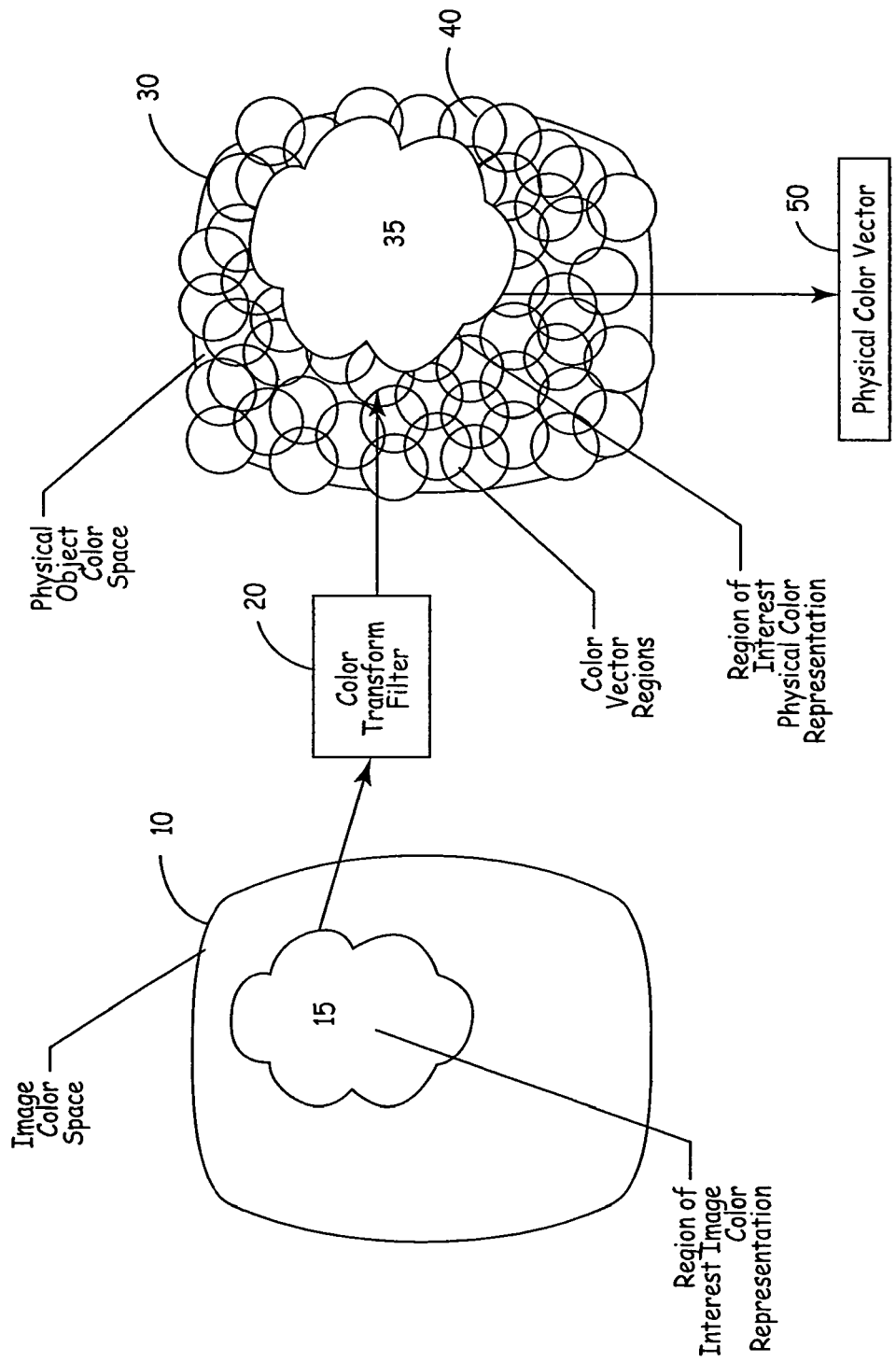
FIG. 1 shows the process of transforming an object's image color space into a physical color space, thus yielding the Physical Color Vector.

Referring to FIG. 1, the Region Of Interest (ROI) image color representation 15 is shown as a three-dimensional volume positioned within the image color space 10. The ROI image color 15 can be determined by a multitude of techniques including, but not limited to, difference filters, Hough transforms, fuzzy logic color filters, and a variety of multi-filter techniques. The image color space 10 can be represented in a variety of models including, but not limited to CIEYUV, XYZ, Lab, HSV and HSL.

Upon achieving the proper description of the image color space 15, the color filter transform 20 will be used to determine proper representation of the color 35 in the physical object color space 30. The physical object color space 30 is a 3-D volume that describes the range of colors for physical objects. Within the physical object color space 30, there is a multitude of overlapping volumes 40 that represent a portion of the physical object color space 30. These overlapping volumes 40 are each represented by fields within the physical color vector 50.

The fields in the physical color vector 50 may be single-bit or multi-bit fields. When multi-bit fields are used, the available quantum levels can represent: 1) the probability that the physical object is the designated color 40, 2) the percentage of the designated color volume 40 contained within the ROI physical color representation 35, 3) the distance from the center of mass of the ROI physical color representation 35 to the center of mass of the designated color volume 40, or some other measure that signifies the relative strength that the representative color 40 contributes to the physical color of the original true object.

Figure 2:
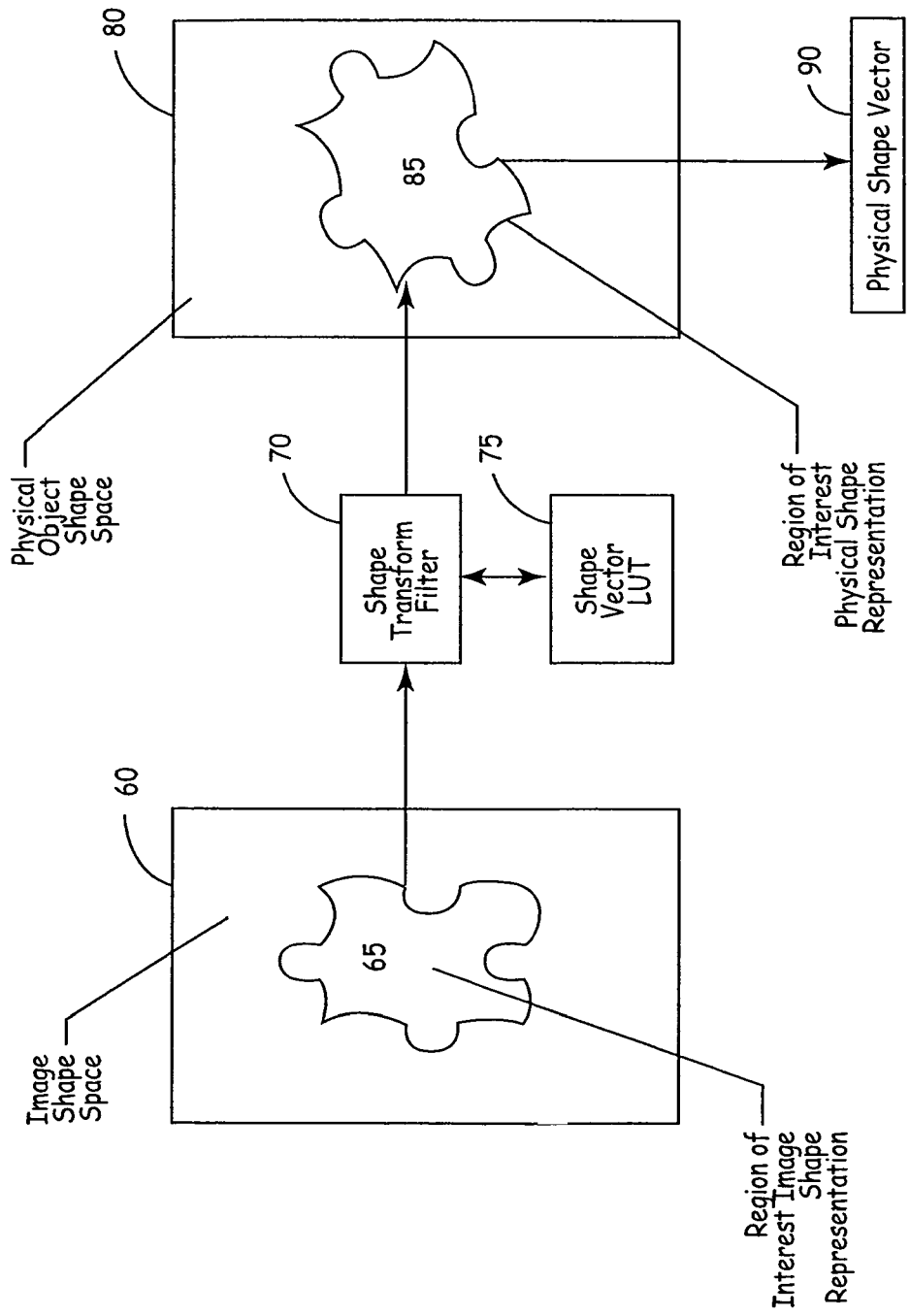
FIG. 2 shows the process of transforming an object's image shape space into a physical shape space, thus yielding the Physical Shape Vector.

FIG. 2 shows the transformation of an image shape 65 to a physical object shape 85 with the use of a shape transform filter 70. First, the shape of the ROI from the image 65 is described within the coordinate system that is the image shape space 60. The image shape space 60 will usually be a Cartesian coordinate system, although certain image types could utilize projection or polar coordinate systems. The physical shape vector 90 will contain fields that represent two-dimensional representations of physical objects. The shape vector lookup table (LUT) 75 contains projections that correspond to the various fields within the physical shape vector 90. The shape vector LUT 75 will likely have multiple entries for each field in the physical shape vector.

The fields in the physical shape vector 90 may be single-bit or multi-bit fields. When multi-bit fields are used, the available quantum levels can represent the probability that the physical object is the designated shape, that it contains feature aspects of the designated shape, or that some other measure that signifies the relative strength that the representative shape contributes to the physical shape of the original object.

The physical object shape space 80 may or may not be expressed in the same coordinate system as the image shape space 60. The selection of coordinate system for the physical object shape space 80 will depend on the image type, the scene descriptors, the context type (single image, series of still images, digital video, etc.), etc.

Figure 3:
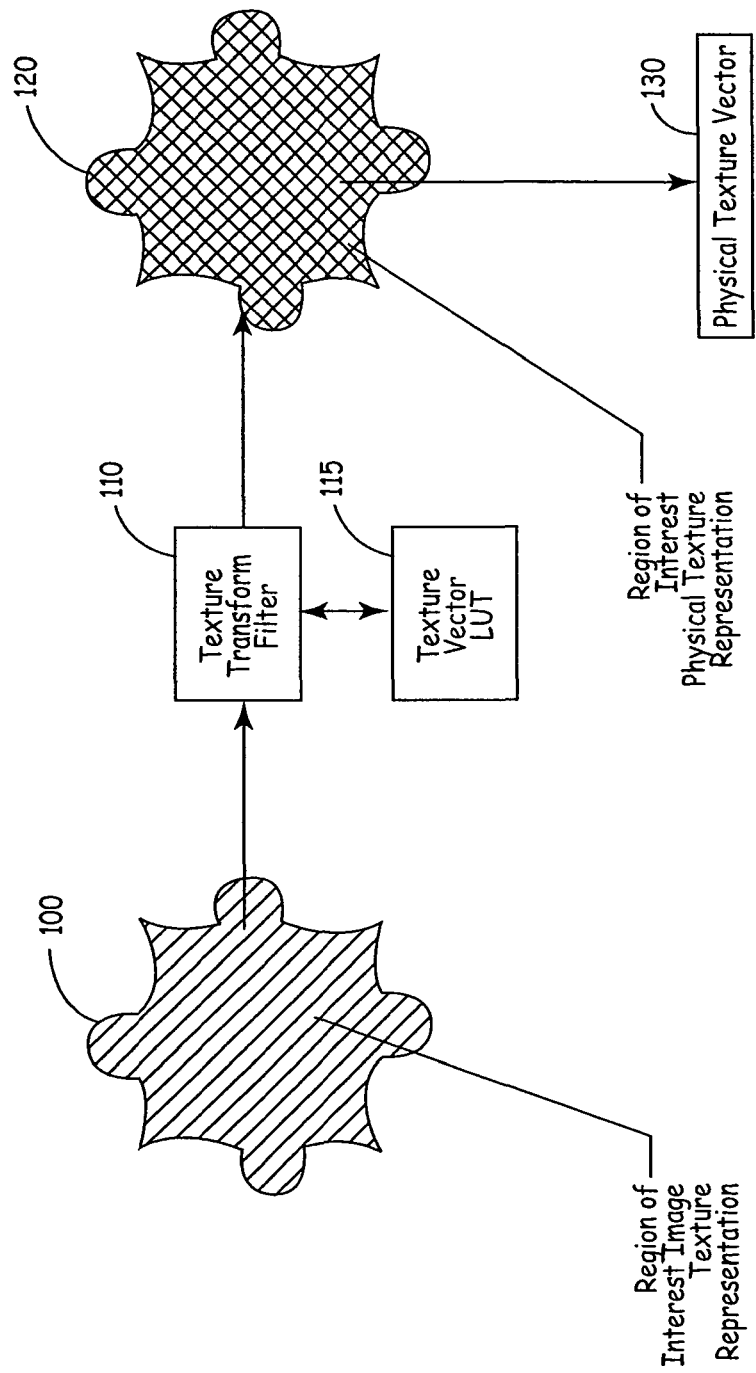
FIG. 3 shows the process of transforming an object's image texture space into a physical texture space, thus yielding the Physical Texture Vector.

FIG. 3 shows the transformation of an image texture 100 to a physical object texture 120 with the use of a texture transform filter 110. The physical texture vector 130 will contain fields that represent textures of physical objects. The texture vector lookup table (LUT) 115 contains mathematical descriptions that correspond to the various fields within the physical texture vector 130. The texture vector LUT 115 will likely have multiple entries for each field in the physical texture vector.

The fields in the physical texture vector 130 may be single-bit or multi-bit fields. When multi-bit fields are used, the available quantum levels can represent the probability that the physical object is the designated texture, is in a similar class of textures, or some other measure that signifies the relative strength that the representative texture contributes to the physical texture of the original object.

Preferably, the physical texture vector will contain more than just texture representations. For example, adjectives like shiny, dull, metallic, transparent, translucent, and reflective can be represented by fields within the physical texture vector.

Figure 4:
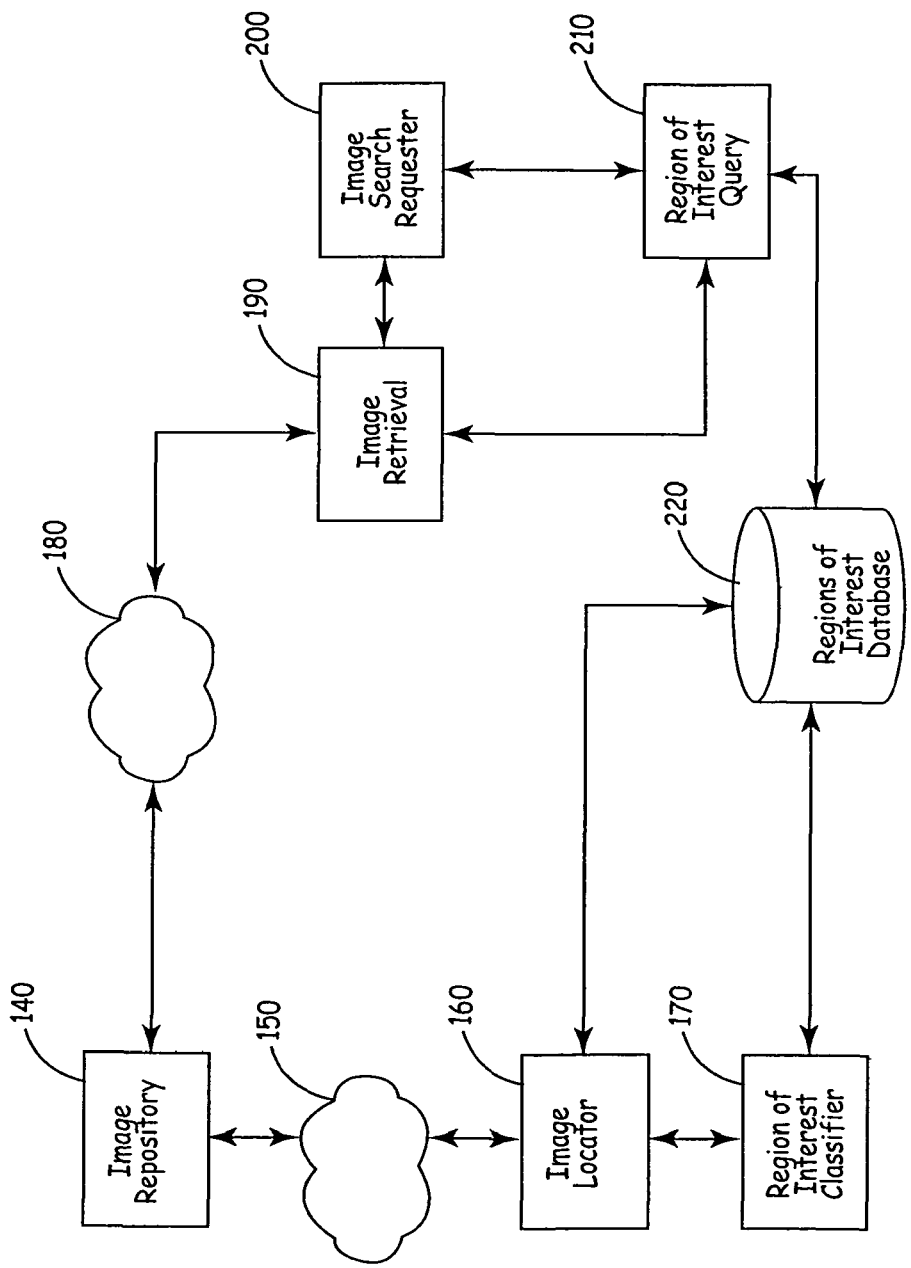
FIG. 4 is a block diagram of the image search and retrieval system.

FIG. 4 shows a functional diagram for the entire image search and retrieval system. The Image Repository 140 represents the physical storage environment that will be searched for the presence of an image. This repository 140 can be a local hard drive, a shared hard drive on a networked computer, one or more file servers attached to a WAN or LAN, or an image storehouse as vast as the Internet. The Regions Of Interest (ROI) database 220 is a relational or analytical database that contains the searchable vectors that represent the images stored in the repository 140. In order for an image to be searchable, it must contain an entry within the ROI database 220.

Entries in the ROI database 220 are created by the image locator 160 and the region of interest (ROI) classifier 170. These two modules work in tandem to locate images within the repository 140 via an interface 150 and extract the relevant information that will be stored in the ROI database 220. The image locator 160 contains automated routines that continually search the repository 140 for the existence of new imagery. Software utilized for searching can be web crawlers, spiders, or any other type of intelligent agent that can continuously search an unstructured network 140 for the existence of new or updated files.

The ROI classifier 170 takes newly located images and splits them into regions of interest using techniques including, but not limited to segmentation, blob analysis, high frequency filter and Fourier transforms. Most images will contain multiple regions of interest. Each region will be analyzed separately and will receive its own data structure representation within the ROI database 220.

Graphical searches are performed by the collaborative workings of image retrieval 190, the image search requestor 200 and the region of interest (ROI) query 210. Any graphical search request will be initiated either by an intelligent agent or by a user. The user search request can originate from inside or outside the network on which the search will take place. The image search requestor is an abstraction layer that translates user or agent search requests into the language understood by the ROI query 210.

As an example, assume that a graphical search user wishes to search for an "Irish Setter." Since these are terms not utilized by the ROI query 210, the image search requestor 200 may format the search request as color=reddish-brown, texture=furry, and shape=dog. Upon submitting this search request, the ROI query 210 will search the ROI database 220 for a list of the files most likely to contain the desired object. Upon determining this list, the ROI query 210 will tell the image retrieval 190 to retrieve the files from the repository 140. The resulting files are retrieved via the interface 180 and returned to the image search requestor 200, which will format them for the user.

Another embodiment of the present invention eliminates the need for the image retrieval 190 and the associated interface to the repository 180. In this embodiment, the image search requestor 200 would simply pass the image file names to the user and allow the higher-level functionality to retrieve the desired files.

FIG. 4 shows a single ROI query 210, although this software is capable of handling multiple simultaneous requests from a plurality of image search requestors 200. A preferred embodiment of the invention would have multiple ROI query 210 modules, each running on the same machine, on different machines within the same facility, separate machines on the same network, or separate machines on physically different networks.

Another preferred embodiment includes multiple ROI databases 220. It is not necessary for all copies of the ROI database 220 to be in tight synchronization. Since the ROI databases 220 are continuously being modified by the ROI classifier 170, the constraint of requiring synchronized ROI databases 220 places unnecessary burdens on the system.

Figure 5:
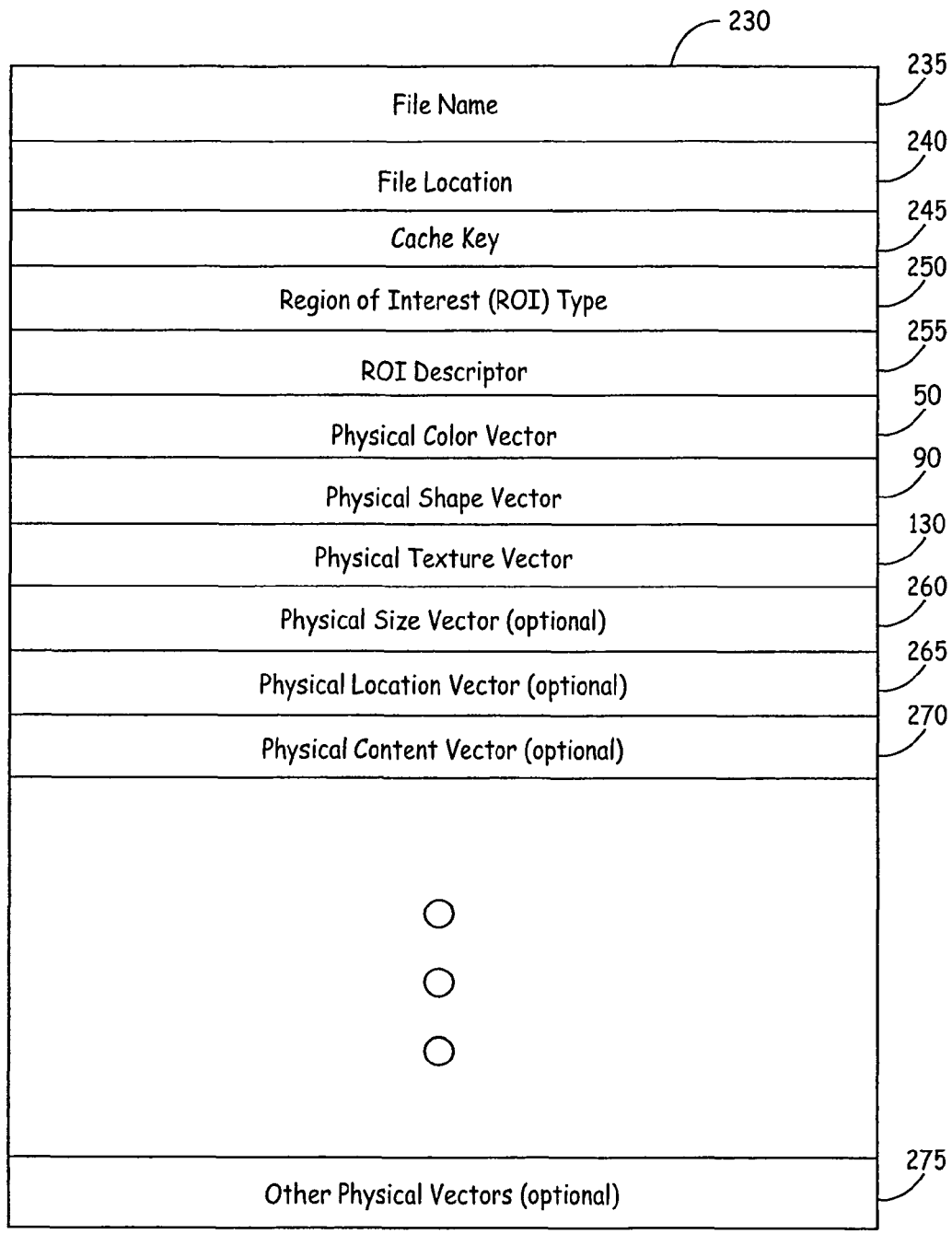
FIG. 5 shows the Region Of Interest data structure

FIG. 5 shows the layout of a typical region of interest (ROI) data structure 230 for an entry within the ROI database 220. Graphically the ROI data structure 230 representation gives the impression that all of the multi-byte fields are the same length, but the fields are all variable length. Every image that is analyzed by the ROI classifier 170 will have at least one ROI data structure 230 within the ROI database 220. In practice, there will be multiple regions of interest contained within each image, with each region of interest having a dedicated ROI data structure 230 within the ROI database 220.

The file name field 235 contains the name of the file that contains the region of interest, and the file location field 240 stores the files location within the network. With a fluid medium like the Internet, graphical files can be changed frequently without any changes to the file name or location. When an ROI data structure is initially created, the cache key is created for the image that is a semi-unique qualifier for the image. The cache key field 245 retains the cache key for later use by the image locator 160 and the ROI query 210. Every time a file is retrieved from the repository the cache key is recomputed and compared to the cache key field 245 in the ROI data structure 230. A mismatch in the two values signifies that the image has been changed since the ROI classifier 170 operated on the original image.

Regions of interest can be described in a multitude of types and formats. Examples of region of interest descriptions include, but are not limited to bounding boxes, polygons, and masks. The ROI type field 250 contains the type of the region of interest, and the ROI descriptor field 255 contains the description of the region of interest that is of the format indicated by the type 250. Since the number of bytes needed to describe a region of interest is quite diverse, the ROI descriptor field 255 can be a small as a few bytes and can be as large as several kilobytes.

The next three fields in the ROI data structure 230 are the previously discussed fields of the physical color vector 50, physical shape vector 90 and physical texture vector 130. Other physical vectors are allowed within the data structure 230. Some possible options are the physical size vector 260, physical location vector 265 and the physical content vector 270.

Figure 6:
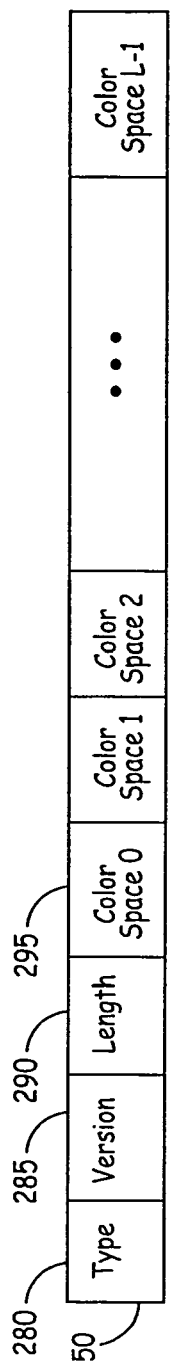
FIG. 6 is a depiction of the Physical Color Vector.

FIG. 6 shows the structure of a typical physical color vector 50, which contains a type field 280 that identifies it as a physical color vector 50 and a length field 290 that identifies the length (in bytes) of the vector 50. The individual color spaces 40 from FIG. 1 are uniquely represented by the color space fields 295 within the physical color vector 50. It is possible for ROI data structures 230 to contain physical color vectors 50 that represent various versions of the individual color spaces 40. The version field 285 identifies the version of the physical color space 30 that was used to quantize the region of interest within the physical color vector 50.

Figure 7:
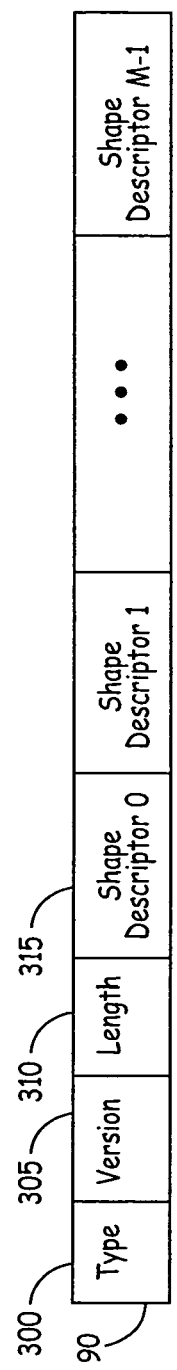
FIG. 7 is a depiction of the Physical Shape Vector.

FIG. 7 shows the structure of a typical physical shape vector 90, which contains a type field 300 that identifies it as a physical shape vector 50 and a length field 310 that identifies the length (in bytes) of the vector 90. The individual shape descriptors are uniquely represented by the shape descriptor fields 315 within the physical shape vector 90. It is possible for ROI data structures 230 to contain physical shape vectors 90 that represent various versions of the individual shape descriptors. The version field 305 identifies the version of the physical shape descriptors that were used to quantize the region of interest within the physical shape vector 90.

Figure 8:
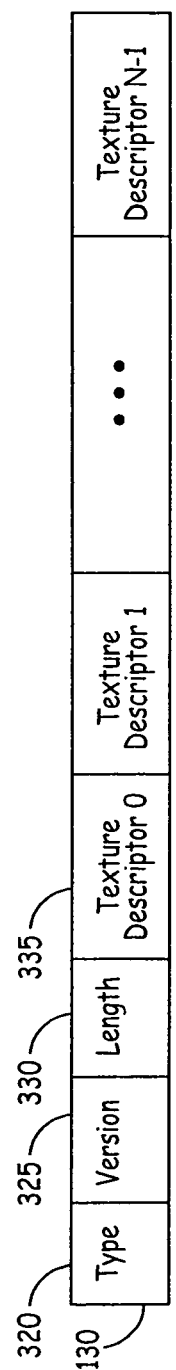
FIG. 8 is a depiction of the Physical Texture Vector.

FIG. 8 shows the structure of a typical physical texture vector 130, which contains a type field 320 that identifies it as a physical texture vector 130 and a length field 330 that identifies the length (in bytes) of the vector 130. The individual texture descriptors are uniquely represented by the texture descriptor fields 335 within the physical texture vector 130. It is possible for ROI data structures 230 to contain physical texture vectors 130 that represent various versions of the individual texture descriptors. The version field 325 identifies the version of the physical texture descriptors that were used to quantize the region of interest within the physical texture vector 130.

In a preferred embodiment of the present invention, the ROI query 210 would be able to alter its search capabilities based on the versions contained with the vectors 50, 90, 130 in the ROI data structure. For example, more advanced versions of a shape vector may include higher-level descriptions of shapes, thus allowing more thorough searches based on higher-level shape constructs.

A preferred embodiment of the present invention allows the ROI classifier 170 to utilize vector versions 285, 305, 325 to compare with the latest versions of each of the vectors 50, 90, 130. When an image is retrieved by the image locator 160 that is already in the ROI database 220, the ROI classifier 170 would check the version numbers of all of the vectors and, when a type of vector is not constructed with the latest version, the ROI classifier 170 would reprocess all of the regions of interest for that image and update the vectors 50, 90, 130 to the latest versions.

Figure 9:
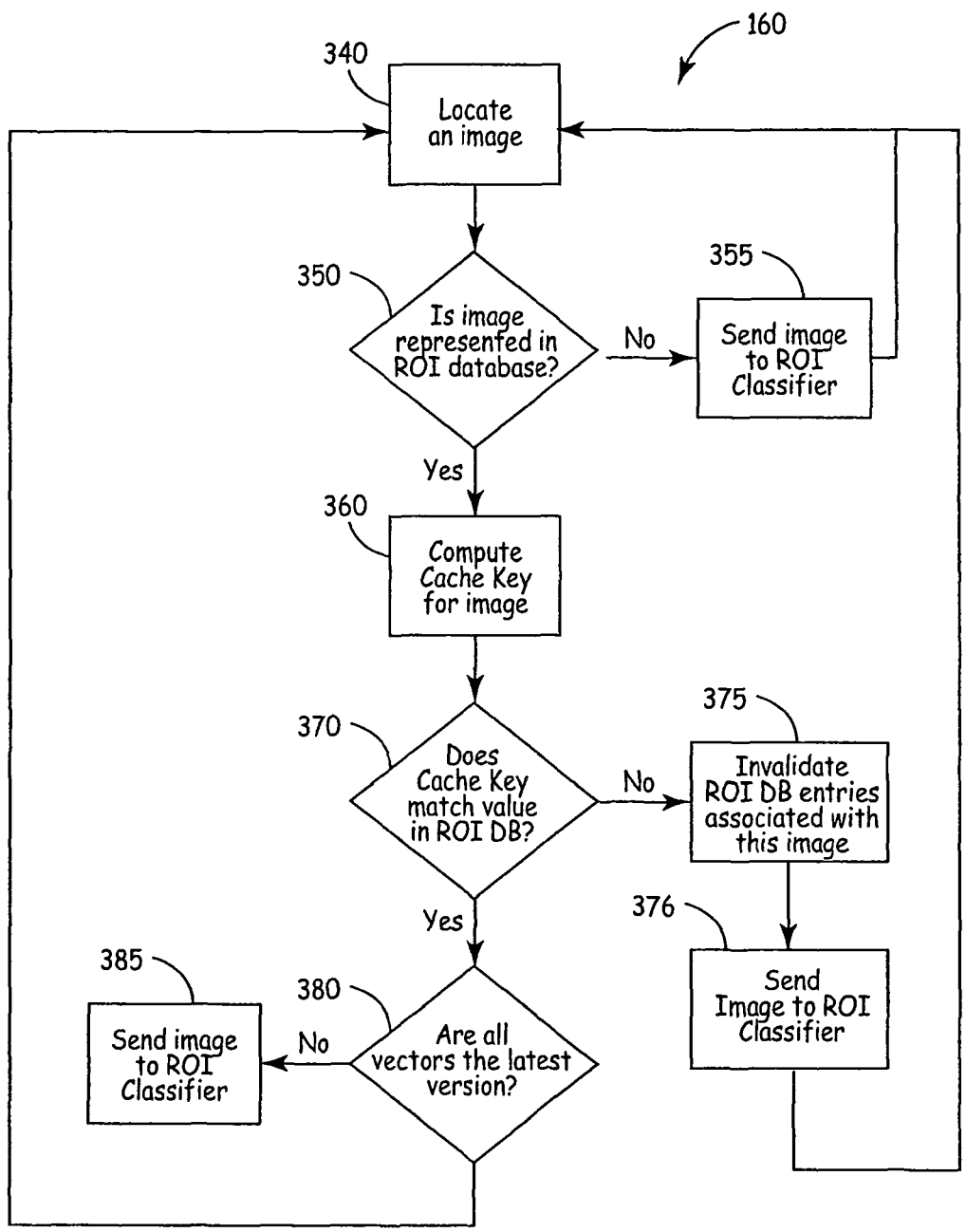
FIG. 9 shows a flowchart of the Image Locator functionality.

FIG. 9 shows a flow chart for the image locator 160. Each time the image locator function 340 finds a file, it checks 350 the ROI database 220 for the existence of an ROI entry for that image. If the image is not represented, the image location is sent 355 to the ROI classifier 170 for analysis. If the file is represented in the ROI database a pseudo-unique cache key is created and compared to the entry 245 in the ROI data structure 230. If the cache key compare fails, all ROI data structures 230 associated with this image are invalidated 375 and the new image is sent 376 to the ROI classifier 170. If the cache key compare passes, the versions 285, 305, 325 of the vectors 50, 90, 130 for all ROI data structures associated with this image are compared 380 to the latest versions. If the versions are the most recent, the software returns to locate another image 340. If one of the vectors is not the most recent, the image is sent to the ROI classifier 170 to be reprocessed.

Figure 10:
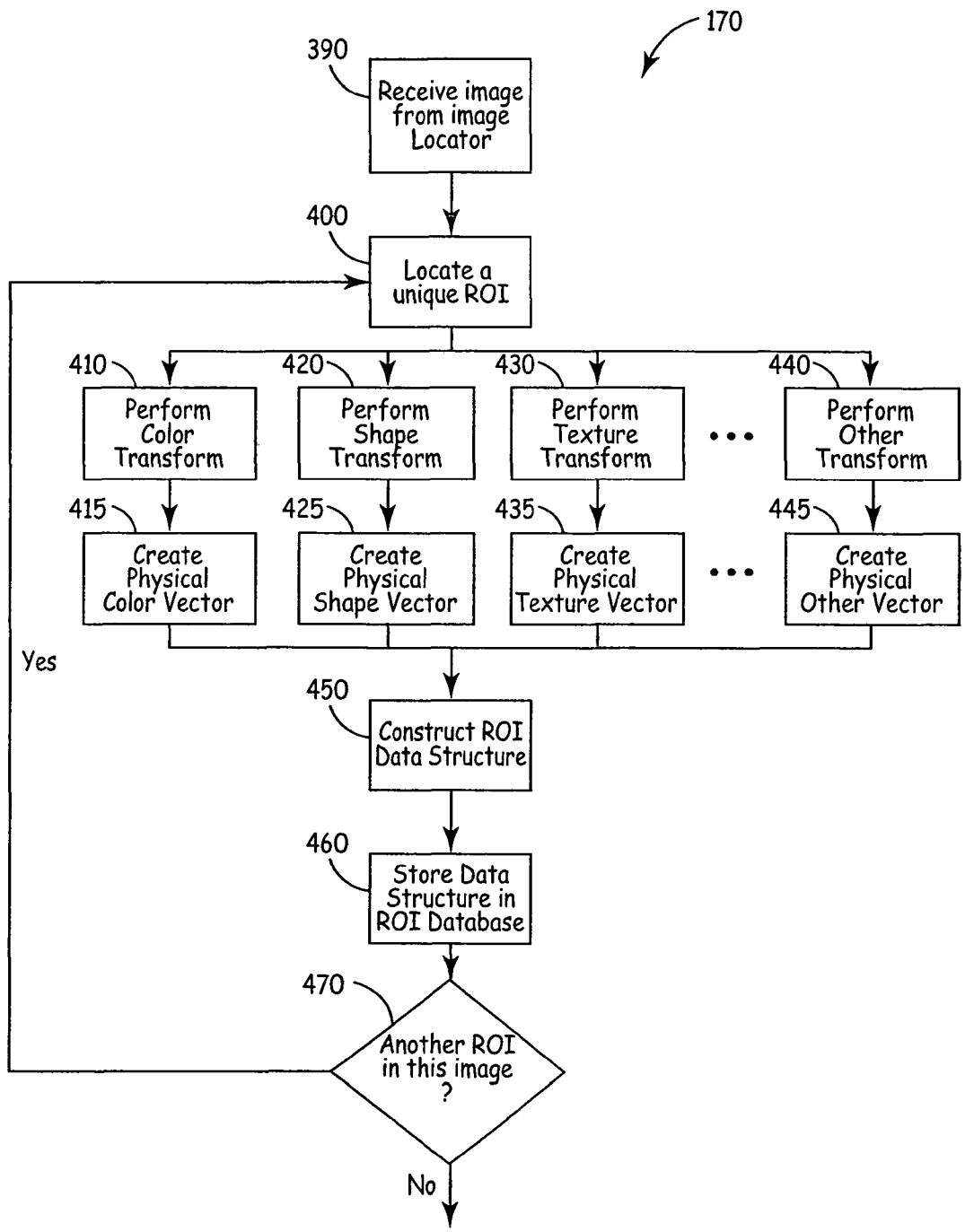
FIG. 10 shows a flowchart of the Region of Interest Classifier functionality.

FIG. 10 shows a flow chart for the ROI classifier 170. When an image is received 390 from the image locator 160, it is processed to find a unique region of interest (ROI) 400. Upon locating a unique ROI, the color transform 410, shape transform 420, texture transform 430, and other defined transforms 440 are performed so the ROI can be described within the physical spaces. The transforms will create 415, 425, 435, 445 physical vectors 50, 90, 130, 275 for the ROI. Next the ROI data structure 230 is constructed 450 and stored 460 in the ROI database 220. The original image is then tested 470 for the existence of another unique region of interest.

Figure 11:
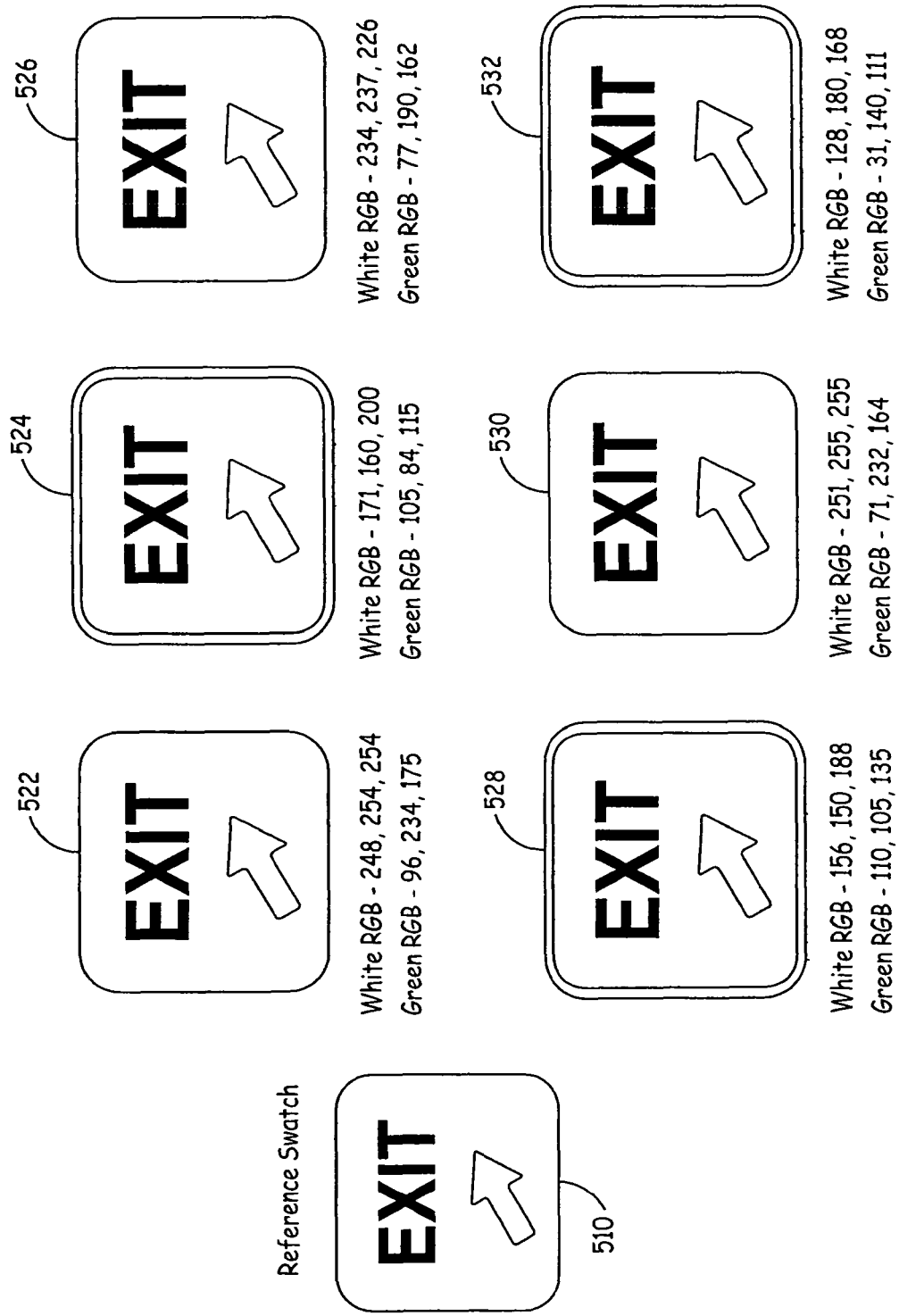
FIG. 11 shows examples of various color image representations of the same physical object.

FIG. 11 shows an example of how a fuzzy logic color filter technique could be applied to a region of interest of an image in order to obtain the physical color vector 50 associated with the actual color of the true object. In this example, the true object 510 parsed from an image is an Exit sign with white and green RGB color values as shown. Various examples of image objects 522, 524, 526, 528, 530 and 532 are also shown depicting the associated RGB color data that might be presented by the content of an image. In this embodiment, a fuzzy logic color filter technique, such as described in U.S. Pat. No. 6,266,442, the disclosure of which is hereby incorporated by reference, could be used, although other techniques, alone or in combination may be useful with the present invention.

Figure 12:
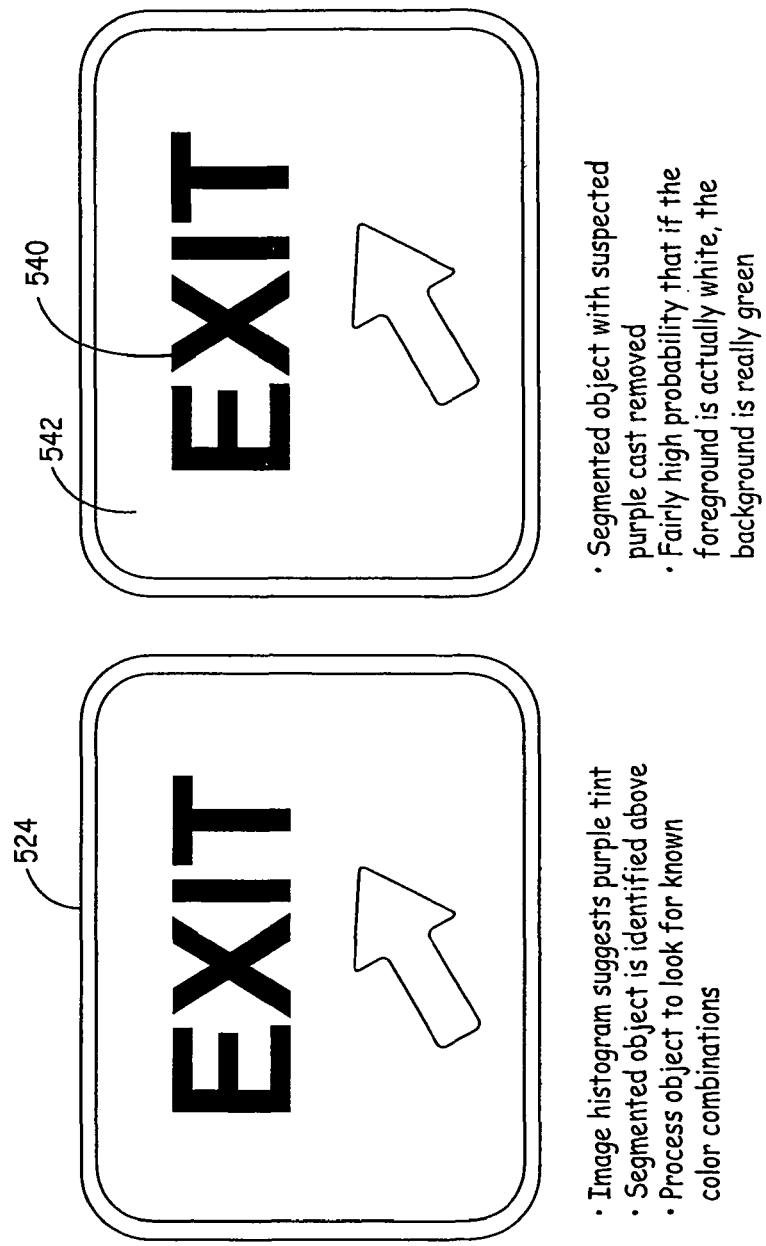
FIG. 12 shows an intermediary processing step for obtaining a Physical Color Vector for the object represented by the images of FIG. 11.

As shown in FIG. 12, an image histogram of image object 524 suggests a purple tint to the object 524. Preferably, the process of obtaining the physical color vector 50 looks for known color combinations. The image object 524 represents the segmented object, the Exit traffic sign, with the suspected purple cast removed. The ROI analysis incorporating the fuzzy logic color filter is used to determine that there is a fairly high probability that if the foreground 540 is actually white, the background 542 is really green. Image processing for color tint removal is not actually performed. Instead, the software determines: IF color A is white, what is the likelihood that color B is green? IF color A is white, what is the likelihood that color B is brown? IF color A is white, what is the likelihood that color B is red? IF color A is white, what is the likelihood that color B is orange?

In this embodiment, a Fuzzy Logic Color Filter (FLCF) is applied to objects for all known or suspected color sets (combinations). The FLCF can be applied to different color sets in parallel. The FLCF can be accomplished with multiple processes on one CPU, or can be implemented within multiple CPUs within one box, or can be effected by a distributed processing approach.

The complete disclosures of the patents, patent applications and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein.

The invention claimed is:

1. A method comprising:
    identifying, by one or more computers, an image in a first storage system;
    determining, by the one or more computers, whether a second storage system includes an entry for the image identifying a region of interest in the image;
    when the second storage system does not include an entry for the image, identifying, by the one or more computers, a region of interest for the image;
    performing, by the one or more computers, one or more transforms on the identified region of interest in order to identify one or more aspects of the identified region of interest.

2. The method of claim 1, wherein the one or more aspects of the region of interest include at least one of color, shape, and texture.

3. The method of claim 1, further comprising:
    for each given aspect of the one or more aspects of the identified region of interest, generating a physical vector representing that given aspect; and
    generating a new entry in the second storage system for the image based on the identified region of interest and any generated physical vector.

4. The method of claim 3, further comprising:
    determining that the second storage system now includes the new entry;
    after determining that the second storage system now includes the new entry, generating a cache key;
    comparing the cache key to data in the new entry; and
    when the compare fails, invalidating the new entry.

5. The method of claim 3, further comprising:
    determining that the second storage system now includes the new entry;
    after determining that the second storage system now includes the new entry, generating a cache key;
    comparing the cache key to data in the new entry; and
    when the compare passes, determining whether to reprocess the image.

6. The method of claim 3, further comprising:
    receiving a search request identifying a true object from a user;
    querying the second storage system to identify the new entry based on the search request; and
    after querying the second storage system, providing the image to the requesting user.

7. The method of claim 1, wherein identifying the identified region of interest includes:
    segmenting the image into a plurality of regions of interest, each region of interest of the plurality of regions of interest containing content associated with one or more actual features of a physical object; and
    extracting at least one physical descriptor from the content for the identified region of interest as a feature vector, each physical descriptor corresponding to one or more actual features of a given physical object in the identified region of interest, wherein the feature vector describes the one or more aspects.

8. The method of claim 7, wherein the extracting includes using one or more transform filters.

9. The method of claim 7, wherein the feature vector includes a searchable data structure including at least one of a physical color vector, a physical shape vector, and a physical texture vector.

10. A system comprising one or more computers configured to:
- identify an image in a first storage system;
- determine whether a second storage system includes an entry for the image identifying a region of interest in the image;
- when the second storage system does not include an entry for the image, identify a region of interest for the image;
- perform one or more transforms on the identified region of interest in order to identify one or more aspects of the identified region of interest.

11. The system of claim 10, wherein the one or more aspects of the region of interest include at least one of color, shape, and texture.

12. The system of claim 10, wherein the one or more computers are further configured to:
- for each given aspect of the one or more aspects of the identified region of interest, generate a physical vector representing that given aspect; and
- generate a new entry in the second storage system for the image based on the identified region of interest and any generated physical vector.

13. The system of claim 12, wherein the one or more computers are further configured to:
- determine that the second storage system now includes the new entry;
- after determining that the second storage system now includes the new entry, generate a cache key;
- compare the cache key to data in the new entry; and
- when the compare fails, invalidate the new entry.

14. The system of claim 12, wherein the one or more computers are further configured to:
- determine that the second storage system now includes the new entry;
- after determining that the second storage system now includes the new entry, generate a cache key;
- compare the cache key to data in the new entry; and
- when the compare passes, determine whether to reprocess the image.

15. The system of claim 12, wherein the one or more computers are further configured to:
- receive a search request identifying a true object from a user;
- query the second storage system to identify the new entry based on the search request; and
- after querying the second storage system, provide the image to the requesting user.

16. The system of claim 10, wherein the one or more computers are further configured to identify the identified region of interest includes:
- segment the image into a plurality of regions of interest, each region of interest of the plurality of regions of interest containing content associated with one or more actual features of a physical object; and
- extract at least one physical descriptor from the content for the identified region of interest as a feature vector, each physical descriptor corresponding to one or more actual features of a given physical object in the identified region of interest, wherein the feature vector describes the one or more aspects.

17. The system of claim 16, wherein the one or more computers are further configured to extract the at least one physical descriptor by using one or more transform filters.

18. The system of claim 16, wherein the feature vector includes a searchable data structure including at least one of a physical color vector, a physical shape vector, and a physical texture vector.

19. The system of claim 10, further comprising the first storage system and the second storage system.

20. A non-transitory, tangible computer readable storage medium including a program that, when executed by one or more computers, causes the one or more computers to implement a method, the method comprising:
- identifying an image in a first storage system;
- determining whether a second storage system includes an entry for the image identifying a region of interest in the image;
- when the second storage system does not include an entry for the image, identifying a region of interest for the image;
- performing one or more transforms on the identified region of interest in order to identify one or more aspects of the identified region of interest.

* * * * *